United States Patent [19]

König

[11] 4,456,446
[45] Jun. 26, 1984

[54] DEVICE FOR APPLYING OIL ON DOUGH PORTIONS

[76] Inventor: Helmut König, Ursprungweg 70-72, A-8045 Graz, Austria

[21] Appl. No.: 432,623

[22] Filed: Oct. 4, 1982

[30] Foreign Application Priority Data

Oct. 2, 1981 [AT] Austria .............................. 4238/81

[51] Int. Cl.³ .................... A21C 11/02; A21D 8/08
[52] U.S. Cl. ................................. 425/102; 118/241; 222/321
[58] Field of Search .................. 425/90, 99, 102, 106, 425/DIG. 115; 222/321; 118/241

[56] References Cited

U.S. PATENT DOCUMENTS

| | | | |
|---|---|---|---|
| 903,584 | 11/1908 | Kohler | 425/95 |
| 1,847,150 | 3/1932 | Ward et al. | 425/94 |
| 2,156,804 | 5/1939 | Dorsch | 118/241 |
| 2,158,910 | 5/1939 | Pellar | 425/106 |
| 2,280,834 | 4/1942 | Kocher | 425/102 |
| 2,823,633 | 2/1958 | Meier et al. | 118/241 |
| 2,856,667 | 10/1958 | Gorsuch | 425/95 |
| 4,249,479 | 2/1981 | Eddy et al. | 118/241 |

*Primary Examiner*—Willard E. Hoag
*Attorney, Agent, or Firm*—Townsend and Townsend

[57] ABSTRACT

A machine for molding or forming dough portions and oiling these dough portions has at least one pestle for the molding or forming operation, which pestle is mounted on a carrier movable in upward and downward direction so that the pestle, when moved downwardly, can deform the upper surface of the dough portion resting on a dough dish to the desired shape. The machine has also an oil applying means which is moved upwardly and downwardly in synchronism with the carrier. The oil applying means has an oil feeding tube which is arranged in front of the pestle, when seen in direction of movement of the dish, so that the dough portion is at first oiled and then deformed by the pestle. The oil feeding tube can be shifted upwardly relative to its mounting menas, said relative shifting movement being used for controlling the oil delivery to the tube.

12 Claims, 5 Drawing Figures

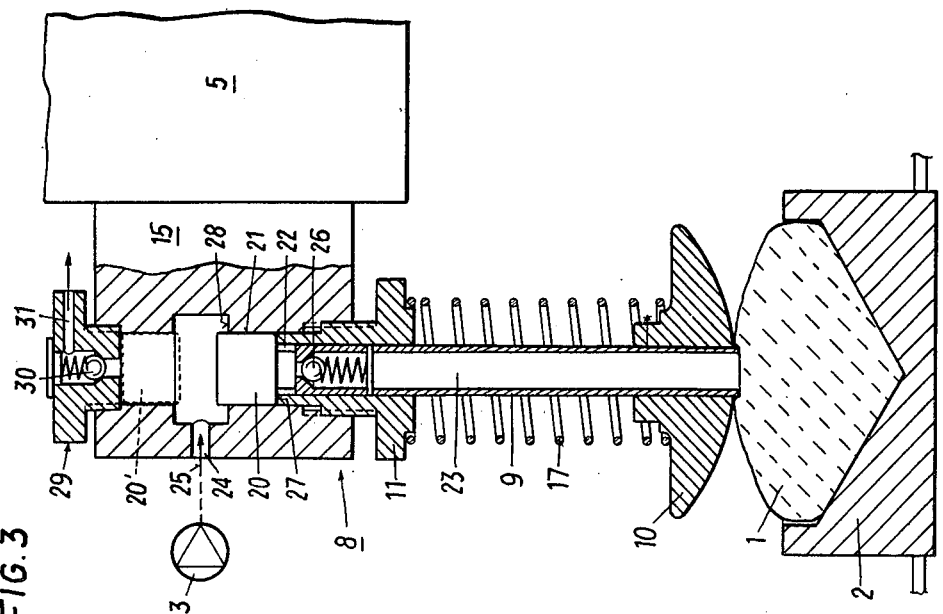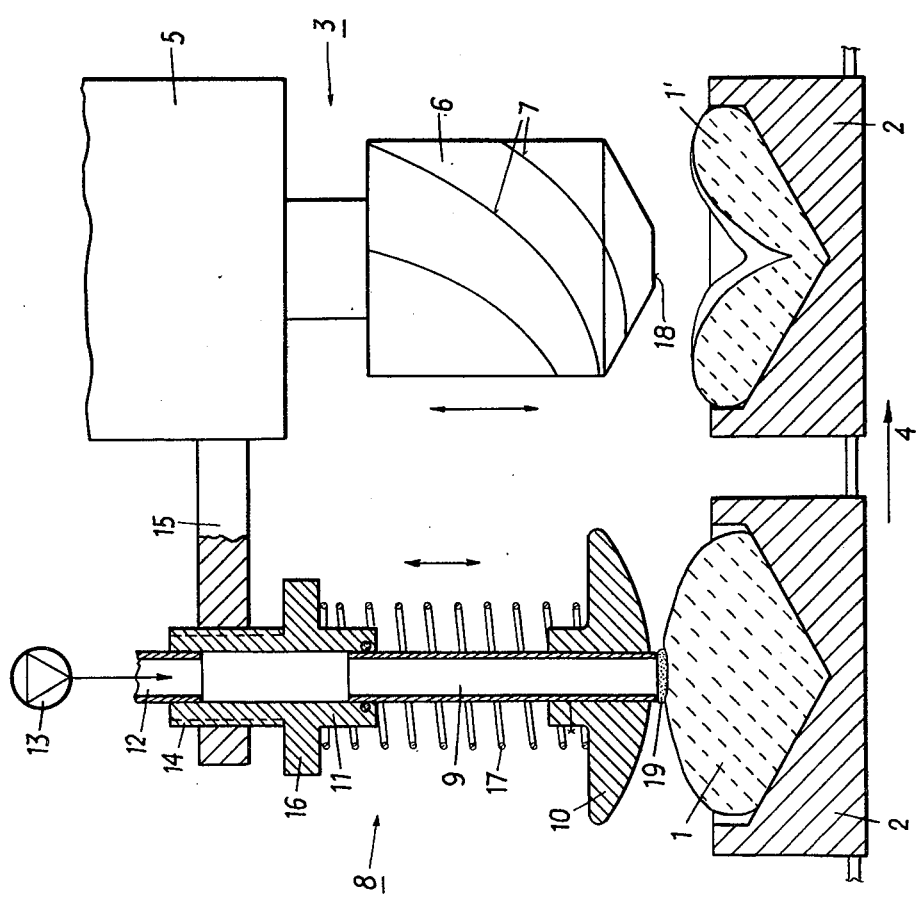

DEVICE FOR APPLYING OIL ON DOUGH PORTIONS

BACKGROUND OF THE INVENTION

The invention refers to a device for applying oil on dough portions, particularly for making semmels or breakfast rolls (Kaisersemmeln), which are provided on their surface with severing areas by means of upwardly and downwardly moved molding or forming tools, in particular by jogging means, said device having a pump for applying the oil onto the dough portion prior to molding same.

When producing dough portions, which are, as is particularly the case with semmels or breakfast rolls (Kaisersemmeln), to be provided on their surface with severing areas by making incisions, slots or the like, the surface of the dough portion is wetted with oil prior to forming the severing areas whereupon the dough portion is deformed on its upper surface by means of said molding or forming tool, in particular this surface is subjected to a jogging operation, during which the surface of the dough portion is pressed in inward direction by the cutting edges of the jogging means or a pestle performing a helical movement. The thus formed severing areas are, together with their surrounding area, wetted with oil after having turned out the jogging means. During the subsequent final roofing or fermentation process, during which the dough portions rest on ther jogged side, the severing areas are folded up and appear to stick together. On shoving the dough portions into the baking oven, which is effected with the jogged side of the dough portions showing in upward direction, the severing areas apparently sticked together are torn, however, on account of the oil being present between the dough parts, a sharp crack is formed which is desired in well shaped semmels or breakfast rolls (Kaisersemmeln) or the like.

THE STANDARD OF ART

It has already been proposed to automatically apply oil on the surface of dough pieces to be molded by pestles or the like. These known constructions apply the oil simultaneously with providing the upper surface of the dough portion with the incisions slots or the like.

A similar effect can also be obtained by applying flour onto the dough portions. Such flouring has even advantages over the application of oil. On the one hand, contamination of the fermentation supports is reduced when compared with applying oil, which is of great importance above all with automatic equipment, where frequently hangers are used as fermentation supports within the fermentation containers, said hangers being difficult to clean. Flouring has, in addition, the advantage that the crust of the baked dough portions remains fresh over a more extended period, whereas with oiled dough portions their surface softens more rapidly and looses its good crust. Tests have shown that the last-mentioned drawback has its origin mainly in the fact that the wetting oil not only remains on the severing areas but also migrates over the whole surface of the dough portion which rests on the support during the final fermentation.

Applying oil on the upper surface of the dough portion, however, has the advantage over applying flour that the molding or forming tool, particularly a pestle for making kaisersemmels or starsemmels (Sternsemmeln) comes free from the dough piece more reliably when compared with floured dough pieces, particularly when working with difficult kinds of dough. Further, in most cases the oiling gives a better taste of the baked product when compared with flouring.

OBJECTS AND SUMMARY OF THE INVENTION

It is therefore an object of the present invention to make use of the advantages of applying oil onto the dough portions without having to do with the mentioned drawbacks when oiling the dough portions.

It is a further object of the present invention to provide for an oiling device for dough pieces having a reliable operation so that the dough pieces come reliably free from the pestles or the like even when working with difficult dough conditions.

It is another object of the invention to improve a device of the kind mentioned above so that the baked products have an improved paste.

It is a further object of the invention to improve a device of the kind mentioned above so that contaminations of the support for the dough pieces are avoided.

It is another object of the invention to provide for a device of the kind mentioned above which is simple in construction and can easily be supervised, cleaned and repaired.

The invention solves this task in that the oil applying means for oiling the dough portion prior to molding same has an oil supply tube to be applied onto the dough portion and being arranged relative to a carrier carrying the molding tool and is positioned, as seen in supply direction of the dough portion, in front of the molding tool and is shiftable in longitudinal direction relative to the support, this shiftable tube being operable to control the oil application onto the dough piece.

Within the spirit of the invention oiling of the dough portion is, in general, effected only at points at the center in which the jogging means hits the dough portion and is effected only in special cases along lines if the molding tool has an engaging surface extending along a line. On account of the fact that only that area of the dough portion receives oil which portion is engaged by the cutting edges of the molding tool, the oil is, immediately after having applied the oil, worked into the severing areas by the cutting edges of the molding tool acting on the surface of the dough portion without oiling those areas of the dough portions which are located adjacent the severing areas. When producing semmels (Kaisersemmeln), the semmel pestles, as a rule, jogging exactly into the oiled center of the dough portion and the cutting edges of the jogging means subsequently distribute the oil only along these cutting edges. The jogged dough portion thus has oil only within the severing areas so that those areas of the dough portions which come to rest on the fermentation support are reliably kept free of oil. Thus, the initially mentioned advantages of oiling are maintained whereas the mentioned drawbacks are avoided and the support and other elements of the machine are kept free from oil contamination.

Further, there is the advantage that the oil can be applied exactly in the centre of the dough piece directly, thus exactly on that point on which the tip of the molding or forming tool, particularly a pestle for making kaisersemmels or starsemmels, starts its working operation, by which the oil is worked into the grooves, slots or other deformations of the dough piece made by the pestle or the like.

According to the invention, an oil supply tube, to be applied onto the dough portion, is provided for the application of oil. This makes it easy to apply oil only to that area of the dough portion, which comes into contact with the oil supply tube. The shorter the time interval is between the moment of oil application and the moment at which the molding tool becomes effective, the less time is at disposal for the oil to become distributed from the oiled surface onto adjacent surface areas. In view of the dough portion being relatively flat at the surface area facing the molding tool, distribution of the applied oil over greater surface areas of the dough portion can reliably be avoided by an appropriate arrangement of the oil applying means and of the molding tool, which can easily by effected by positioning the oil applying tube in the immediate neighbourhood, that is to say just before, of the pestle or the like.

According to the invention, the arrangement is such that the oil supply tube is an effective constituent part of the oil supplying control means. This provides the advantage that only those oil applying means become effective which cooperate with a dough portion, so that oiling section is suppressed if for any reason no dough portion comes to rest below the oil applying means. Any contamination of the dough portion supports by unnecessarily supplied oil is thus avoided and, in addition, also the amount of oil consumed is reduced. A particularly favourable construction is, according to the invention, achieved by the feature that the oil supply tube is shiftable in longitudinal direction and relative to its support means, preferably against the acting of spring. Preferably, this tube is upwardly and downwardly moved with its support means in time with the movement of the molding tool by a drive, said both movements being made use of for controlling the oil delivery. Thus, application of oil on the dough piece is with simple means automatically controlled by said upward and downward movement. According to the invention, a particularly favourable embodiment results in this case if the oil supply tube is at its upper end provided with a pump piston, which opens against the action of the spring a working space provided within the support means of the oil supply tube during the upward movement of the oil supply tube relative to the support means and closes under the action of the spring during the relative downward movement of the oil supply tube this working space, thereby supplying oil via a check valve or none-return valve to the dough portion. In this manner, one can do also without a separate oil supply pump. For avoiding the dough portion from becoming excessively compressed by the engaging oil supply tube, the arrangements is, according to a preferred embodiment of the invention, such that at the lower end of the oil supply tube an enlargement, particularly a flange-like precompressing element, is provided simultaneously forming the abutment for the spring surrounding the oil supply tube. Preferably, the oil supply tube slightly protrudes over the bottom surface of this enlargement. By these preferred embodiments the construction is simplified and a quite small depression is provided by the protruding part of the oil supply tube, said depression accommodating the oil supplied. Thus there is obtained an additional counteraction against the undesired distribution of oil over those surface areas of the dough portion which are adjacent the area of action of the cutting edges of the molding tool.

The desired dosage of the amount of oil applied to each dough portion can, according to the invention, be obtained if a wall of the working space is formed of a bushing surrounding the oil supply tube and screwed into its support means and forming an abutment for the pump piston and preferably also forming a guide means for the oil supply tube.

In a further embodiment of the invention, a venting valve is conveniently provided above the working space allowing to remove any undesired amount of air having entered.

A particularly simple construction of safe operation results, if the support means of the oil supply tube is connected with the upwardly and downwardly moving carrier for the molding tool. This provides in a simple manner a compulsory synchronization of the movements of the molding tool and of the oil applying means. For the purpose of reducing as far as possible the time span available for the oil to become distributed over undesired surface areas of the dough portions, it is convenient if the oil supply tube is arranged laterally relative to the molding tool and in front of the molding tool for one step of the support transferring the dough portions to the molding tool.

DESCRIPTION OF THE DRAWINGS

In the accompanying drawings the subject of the invention is schematically illustrated by way of preferred embodiments.

FIG. 1 shows in a side elevation an oil applying means in a jogging machine for semmels (Kaisersemmels) or breakfast rolls.

FIG. 3 shows a modified embodiment in a vertical section.

Figure 2:
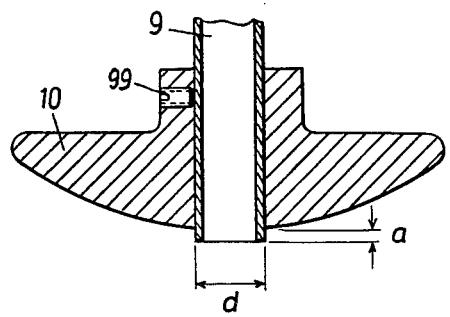
FIG. 2 shows a detail in an enlarged scale.

In the embodiment according to FIGS. 1 and 2, the dough portions 1 to be jogged are, in a semmel jogging machine, step-wisely transferred on dough dishes 2 to the jogging means 3, constituting the molding or forming device. The dough dishes 2 are connected one with the other to form an endless dough dish chain which is stepwisely forwardly shifted in direction of arrow 4 for one dough dish. Jogging of the dough portions 1 is effected by a carrier 5 for the molding tools, which is upwardly and downwardly moved in a manner well known per se and in synchronism with the supply steps of the dough dishes by drive means not shown, the carrier 5 having arranged thereon a plurality of molding pestles 6, the number of the pestles 6 being equal to the number of dough dishes 2 present in one row of dishes 2 extending perpendicularly to the direction of arrow 4. The molding pestles 6 are provided with cutting edges 7, by means of which the star of the pastry product, particularly the star of a Kaisersemmel or of a starsemmel is formed in a manner well known per se. The dough portion shaped in such a manner is designated 1'. When producing this star, the molding pestles 6 are simultaneously lowered (for making Kaisersemmels) also turned and, after having acted on the dough portion, again lifted (for making Kaisersemmels simultaneously turned back).

An oil applying means 8 is connected with the carrier 5 for the molding tool and has oil supply tubes 9 in equal number as there are dough dishes 2 per row. Each oil supply tube 9 has at its lower end a flange-like element 10 connected thereto by means of a screw 99 so that this element 10 can be adjusted in its position relative to the tube 9, which is guided with its upper end within a bushing 11 for upward and downward shifting movement, i.e. for being shifted in its longitudinal direction, and is tightened with respect to this bushing 11 by means of a sealing ring. A hose 12 is connected to the bushing 11 and leads to an oil reservoir 13 having a pump of any suitable construction which supplies oil for oiling the dough portions 1 via the hose 12 to the oil supply tube 9 in synchronism with the upward and downward movement of the carrier 5 of the molding tool. The bushing 11 is screwed for height-adjustment with a thread 14 into an arm 15 fixed to the carrier 5 of the molding tool. Between a flange 16 of the bushing 11 and the flange-like element 10 a spring 17 is interpositioned, preferably a helical compression spring which has the tendency to press the oil supply tube 9 in downward direction. In order to avoid loose of the tube 9, the ends of the spring 17 are connected by suitable fastening means (not shown) to the element 10 and to the bushing 11, respectively. This tube 9 engages the dough portion 1 on its upper side during downward movement of the carrier 5 of the molding tool, whereupon the pump 13 is controlled such that the oiling step can be started. This can easily be done using the relative movement of the tube 9 with respect to the bushing 11 caused by the penetration resistance of the dough piece 1 as a starting signal for the pump to feed oil for a predetermined time or in a predetermined amount, f.i. by any suitable electrical control known per se.

Excessive penetration of the oil supply tube 9 into the surface of the dough portion is prevented, on the one hand, by the element 10 enlarged in a flange-like manner and, on the other hand, also by the oil supply tube 9 being shifted in upward direction relative to its support means 15 against the action of the spring 17. As is shown in FIG. 2, the lower end of the oil supply tube 9 protudes only slightly for a distance a of approximately 3 mm beyond the lower surface of the element 10 and has an outer diameter d of approximately 8 mm. As is shown in FIG. 1, the oil supply tube 9 is centrally applied on top of the dough portion 1, i.e. to that area of the dough portion 1 which is first acted upon by the edges 7 of the molding pestle 6 and its tip 18, respectively. As is further shown in FIG. 1, oil 19 is applied to the dough portions 1 for only one advancing step of the dough dishes 2 upstream of the jogging area of the machine, so that there is no time for the oil 19 to become distributed over substantial areas of the surface of the dough portion 1. Such a distribution of the oil is further counteracted by the slight depression formed by the tube 9 within the dough portion 1. During the jogging operation, the oil supplied is then worked into the severing areas, generated by the cutting edges 7, of the surface of the dough portions, so that oil is applied only to said severing areas, whereas adjacent areas of the surface of the dough portion 1 remain free of oil. At the latest as soon as the oil supply tube 9 is again lifted, the control of oil delivery actuates the pump so that the pump 3 interrupts the supply of oil, so that no oil can subsequently drop out of the tube 9.

In the embodiment according to FIG. 3, the oil applying means 8 can be fixed on the carrier 5 for the molding tool of the jogging machine in the same manner as it is shown in FIG. 1, however, also a separate carrier for the oil applying means 8 can be provided. The essential difference between the embodiment according to FIG. 3 and the embodiment according to FIG. 1 consists in that the oil applying means 8 has its own oil pump for each oil supply tube 9, said oil pump is provided within or fixed to the support arm 15 and is controlled by the upward and downward movement of the support arm 15 as well as the relative shifting movement of the oil supply tube 9 with respect to the support arm 15. For this purpose, each oil supply tube 9 is provided at its upper end with a pump piston 20 shown in FIG. 3 in its lowermost position, in which the pump piston engages the upper end of the bushing 11 screwed into the support arm 15 and guiding the oil supply tube 9. This upper end of the bushing 11 forms a wall of a working chamber 21 for the pump piston 20. Below the pump piston 20, the oil supply tube 9 is provided with radial bores 22 through which the oil can flow from the working chamber 21 into the central bore 23 of the oil supply tube 9. The oil is supplied from an oil reservoir 13 or oil source in direction of the arrow 25 into the support arm 15 via an oil supply channel 24. Below the bore 22, there is seated a spring loaded check valve or non-return valve 26 which opens as soon as the oil contained within the working space 21 is pressurized by the pump piston 20. The function is as follows: As soon as the dough portion 1 is located below the oil supply tube 9, the carrier 5 for the molding tool moves in downward direction and takes with it the support arm 15 and the oil supply tube 9 until this tube contacts with its lower end the dough portion 1. The oil supply tube 9, which is prevented from penetrating into the dough portion 1 by the element 10, is thus stopped, so that during the subsequent further downward movement of the carrier 5 for the molding tool and, respectively, the support arm 15, the spring 17 becomes compressed. Thus, the pump piston 20 becomes lifted relative to the support means 15 and may reach its uppermost position 20' shown in dashed lines. Meanwhile, there is time enough for the oil to flow into the working chamber 21 in direction of the arrow 25. As soon as the carrier 5 of the molding tool starts its upward movement, the oil supply tube 9 is downwardly shifted under the action of the spring 17 relative to the support means 15 and the lower edge 27 of the pump piston 20 slides over a recessed groove 28 of the wall of the working chamber 21, so that the oil present between the lower edge 27 of the pump piston and the upper edge of the bushing 11 is compressed. This oil flows into the central bore 23 of the oil supply tube 9 via the bores 22, whereby the check valve 26 is moved in open position. As soon as the lowermost position of the pump piston 20 is reached, oil application is stopped. Thus, only a predetermined dosed amount of oil can reach the dough portion 1, said amount of oil being adjustable by screwing the bushing 11 into the support means 15 to a more or less extent and, respectively, by the thus changed capacity of the active working chamber 21.

A venting valve 29 is screwed at a position following the uppermost position 20' of the pump piston and has an air venting bore 31 closed by a check valve or non-return valve 30. If air shall be vented, the oil supply tube 9 and thus the pump piston 20 are manually pressed for its whole stroke in upward direction into the uppermost position, thereby expelling the air contained within the working space chamber 21 via the check valve 30.

Figure 5:
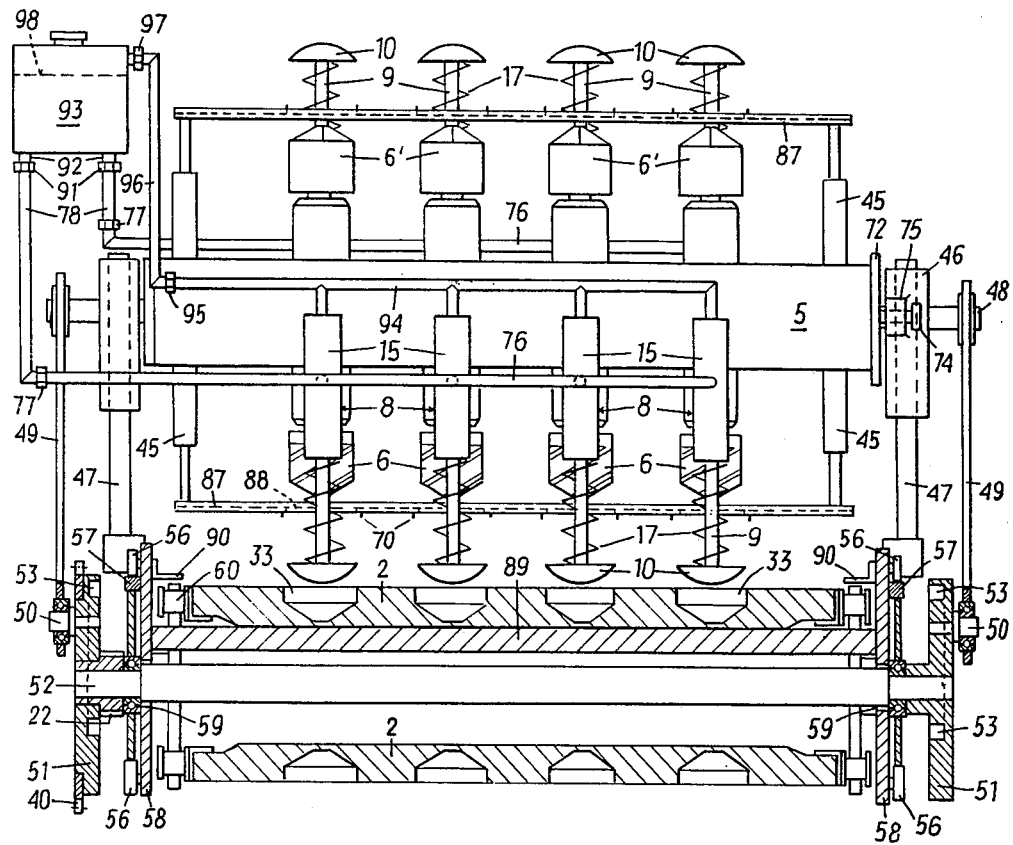
FIG. 5 is a section along the line V—V of FIG. 4.
Figure 4:
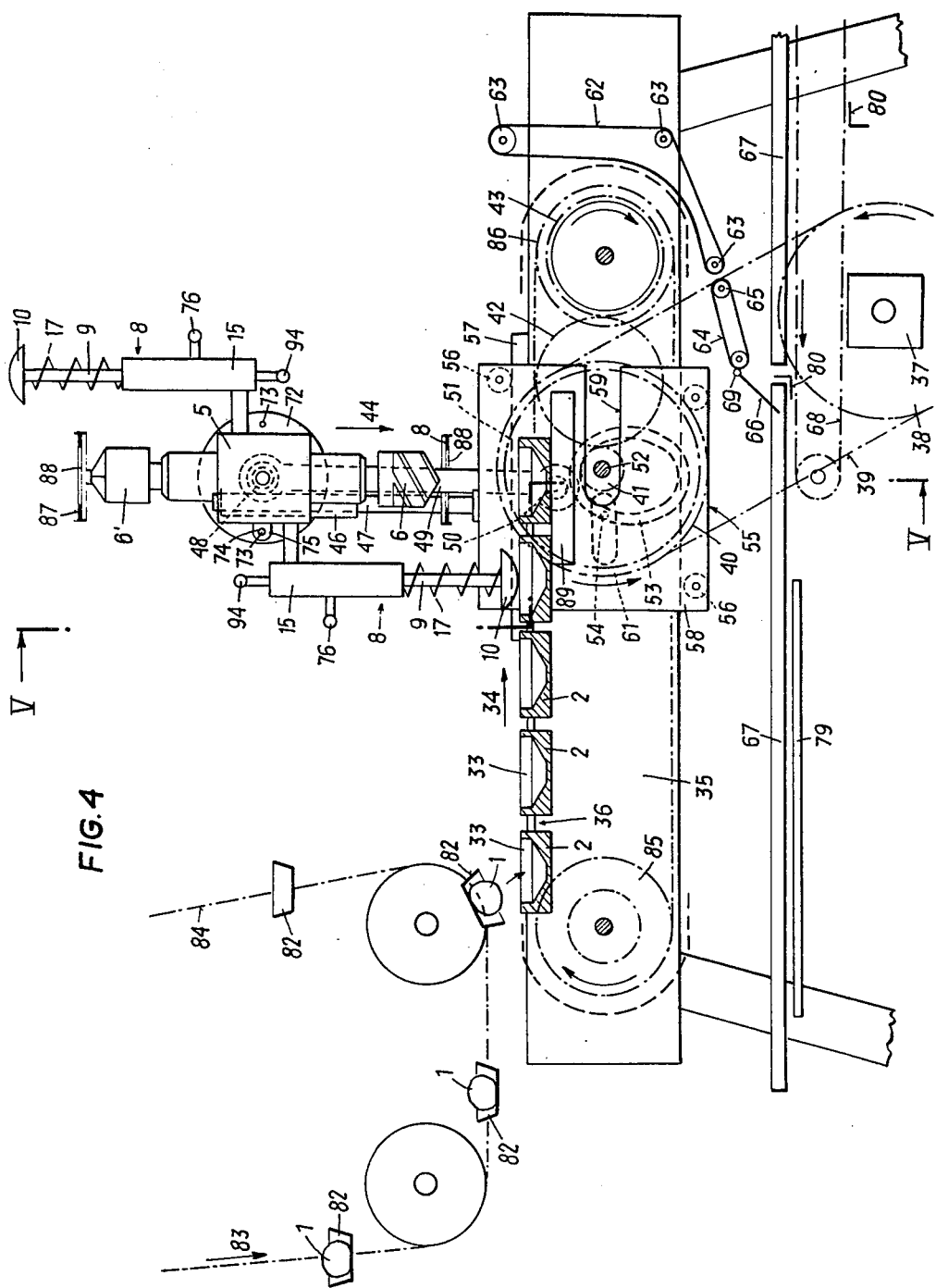
FIG. 4 shows a more detailed side elevation, partially in section, of another embodiment of the invention.

The embodiment according to FIGS. 4 and 5 is similar to that according to FIGS. 1 and 2, but has a continuous advance of the chain of molding dishes 1. The dough pieces 1 to be molded are fed after pre-roofing in a roofing chamber by means of hangers 82 in direction of the arrow 83, which hangers 82 are pivotally fixed to an endless chain 84. A tilting means (not shown) of any desired construction tilts the hangers 82 whereby the dough pieces 1 slide off the hangers 82 and fall into the hollow 33 of the respective molding dish 2. The molding dishes 2 are fed in an endless chain 36 around the return wheels 85, 86 continuously in direction of the arrow 34. The return wheels 85,86 are mounted for rotation in the frame 35 of the machine. The chain 36 is driven by a motor 37 fixed to the frame 35, which motor 37 drives a sprocket wheel 38 driving a chain 39 which drives a sprocket wheel 40, on the shaft of which there is mounted a pinion 41 which drives via a pinion 42 a pinion 43 mounted on the shaft of the return wheel 86. The speeds of the molding dish chain 36 and of the chain 84 are so chosen that the dough pieces 1 delivered by the hangers 82 always fall exactly into the hollows 33 of the dough dishes 2. Each dough dish 2 has four hollows 33 arranged in a row extending transversely to the moving direction (arrow 34). The machine has two rows of pestles 6,6' acting on the dough pieces 1 lying in the hollows 33. The pestles 6 give the dough pieces a shape suitable for kaisersemmels, the pestles 6' however, give the dough pieces 1 a shape suitable for starsemmels (Sternsemmeln). The pestles 6 producing kaisersemmels are so mounted on the carrier 5 that they are turned around their axis when the carrier moves down (arrow 44) and when the pestles 6 contact the upper surface of the dough pieces 1. Further, the carrier 5 has a stripper plate 87 for each set of pestles 6, 6' which stripper plate is resiliently mounted on two rods 45 (FIG. 5) which can be resiliently elongated telescopically. Each stripper plate 87 has an opening 88 for each pestle 6 or 6' through which opening the pestle 6 or 6' passes when the carrier 5 is moved downwardly. The stripper plate 87 serves for stripping off dough pieces adhering to the upwardly moved pestles 6 or 6', so that these dough pieces fall back into the hollows 33. The carrier 5 is fixed to sleeves 46 which can be moved up and down along guiding rods 47 (FIG. 5) and carry pins 48 rotatably fixed to connecting rods 49, the other ends of which are rotatably connected to plugs 50 mounted on cam discs 51 arranged on both sides of the frame 35 and mounted for rotation therein by means of a common shaft 52. Each cam disc 51 has on its surface facing the frame 35 a groove 53 into which a guide roller 54 (FIG. 4) is guided which is rotatably mounted on a carriage 55 guided by means of rollers 56 along rails 57 of the frame 35. The carriage 55 has two lateral plates 58 connected to each other by a middle portion 89 forming the support for the dough dishes 2 during molding of the dough pieces. The plates 58 have slots 50 so that the carriage 55 can be reciprocally mounted relatively to the frame 35, the slots 59 being moved relatively to the shaft 52 during this motion. The sprocket wheel 40 for driving the molding dish chain 36 is mounted on the shaft 52 or on a cam disc 51 fixed to this shaft. The molding dishes 1 extend transversely to the moving direction of the chain 36 and are fixed on both sides of the machine to roller chain 60 driven by the return wheel 86 which is a sprocket wheel.

The guiding rods 47 for the carrier 5 are fixed to the lateral plates 58 of the carriage 55. The guide rollers 54 project through slots 61 (FIG. 4) of the frame 35.

The dough pieces molded by the pestles 6 or 6' are secured in the region of the return wheel 86 against falling out of the hollows 33 by a transfer element 62 (FIG. 4) constituted by an endless conveyor belt which runs over guide rollers 63 and along a section of the surface of the mold dish chain 36. The molded dough pieces transferred from the dishes 2 to the transfer element 62 are transferred from this element 62 to a further endless transfer band 64 which can be reciprocally shifted in the direction of its return roller 65 in synchronism to the feeding of the dough pieces. This transfer band leads the dough pieces to a flap 66 on which the dough pieces slide to deposition plates 67 which are conveyed on a support 79 by means of a conveyor belt 68 provided with take along means 80 under the molding device of the machine in the frame 35. In order to provide the deposition plates 67 with upwardly angled margins, the flap 66 is pivotally mounted on its upper edge 69 in the frame 35. The above mentioned reciprocating movement of the transfer band 64 serves for a space sparing zigzag deposition of the delivered dough pieces on the deposition plates 67.

The dough pieces lying in the molding dishes 2 become molded by means of the molding pestles 6 or 6', respectively, which are driven for an up and down movement together with the molding tool carrier 8 by means of the connecting rods 49. Simultaneously with this movement the carriage 55 carrying the guiding rods 47 is shifted in a reciprocating manner by means of the guide rollers 54 running in the grooves 53 of the cam discs 51, which guide rollers 54 are mounted on this carriage. This movement is so synchronized with the advance movement of the molding dish chain 36 that molding of the dough pieces 1 by means of the pestles 6 or 6' is done unobjectionable. In order to avoid that during the downward movement of the carrier 5 the stripper plate 87 contacts the dough pieces 1 to be molded, stops 70 (FIG. 5) may be provided on the plates 58 of the carriage 55, which stop limits the downward movement of the stripper plate 87. However, it is also possible to provide stops 70 (FIGS. 4,5) on the stripper plate 87 in the region of the margin of each opening 88 which stops 70 protude downwardly and cooperate with those regions of the molding dishes 2 which surround the hollows 33.

In order to change the machine from an operation with the molding pestles 6 to an operation with the molding pestles 6' or vice-versa the carrier 5 is tilted around its horizontal axis defined by the pins 48, so that the desired kind of pestles protude from the carrier 5 towards the molding dish chain 36 and is thus in position ready for operation. The pins 48 are mounted for rotation in the sleeves 46 and a plate 72 is provided on one front end of the carrier 5, which plate 72 has two notches 73 corresponding to the two pestle sets 6, 6'. In these notches 73 a fixing bolt 74 may be inserted which protudes through a protrusion 75 mounted on the sleeve 46 facing the plate 72. In order to change the machine from producing the one kind of breakfast rolls or pastry (for example kaisersemmels) to the other kind of rolls or pastry (for example starsemmels) it is only necessary to pull the fixing bolt 74 out of the notch 73 coordinated to the pestles 6 for molding kaisersemmels, whereupon the carrier 5 together with the pestles mounted on it can be tilted around the axis of the pins 48 so that the pestles 6' necessary for molding starsemmels are brought into the working position. After inserting the fixing bolt 74 into the starsemmel-notch 73 of the plate 72, the machine is ready for operation.

Of course the carrier 5 may carry more than two different kinds of molding pestles 6,6' arranged radially to the axis of the pins 48, which plurality of pestle sets may be fixed in their operation position in an analogous manner.

The oil applying means for its set of pestles 6, 6' within the embodiment according to FIGS. 4 and 5 corresponds substantially to that shown and described in connection with the embodiment according to FIG. 3. As shown in FIG. 5, to each pestle 6,6' a flange element 10 is correlated which is resiliently abutted in the manner shown in FIG. 3, which element 10 surrounds an oil feeding tube 9. All these oil applying means 8 of each set of pestles 6 or 6' are connected with their channels 24 (FIG. 3) for feeding oil to a common oil feeding line 76 (FIGS. 4,5) which is connected via a fitting 77 (FIG. 5) to an oil feeding hose 78 which is connected via a fitting 91 and a shut off valve 92 to an oil tank 93 which is fixed to the frame 35 in elevated position so that oil runs by gravity from the oil tank 93 to the pestles, if the shut off valve 92 is open. Further, a common venting line 94 (FIGS. 4,5) is connected to the venting bore 31 (FIG. 3) of each oil applying means 8, which venting line 94 is connected via a fitting 95 to a hose 96 connected via a fitting 97 to the oil tank 93 above the uppermost oil level 98 in this oil tank 93. In this manner any oil particle transported by the vented air flows back into the oil tank 93. The hoses 78, 96 allow the above described upward and downward movement of the oil applying means 8 in synchronism of the movement of the carrier 5. For the set of pestles 6' the same elements are provided, as shown in FIGS. 4 and 5 and a second oil tank 93 may be provided so that the fittings 77, 95 can be always connected via hoses (not shown) to this oil tank. However, it is sometimes more convenient to disconnect the set of pestles 6 or 6' not in operation by means of the fittings 77, 95 from the hoses 78, 96, as this is shown in FIG. 5 for the oil feeding line 76. Further, for both sets of pestles 6, 6' hoses 78, 96 may be provided which hoses are always fix connected to the oil tank 93 so that only the shut off valve 92 of the pestle set just in operation must be opened in order to make the oiling device ready for operation. Further, within the last mentioned embodiment, the shut off valve 92 can be saved if the set of pestles not in use is at a level above the uppermost oil level 98 in the oil tank 93. In this case, the oil cannot flow by gravity to these pestles showing upwardly from the carrier 5.

What is claimed is:

1. A machine for molding and oiling dough portions, comprising:
    a vertically reciprocatable mold member and a reciprocatable support therefor,
    a support means for carrying a dough portion to be molded to a position below said mold member, said mold member having means for penetrating into the surfaces of said dough portions and producing cuts on surface areas of said dough portions,
    oil applying means for applying oil to said dough portions before said dough proportions are contacted by said means for penetrating, said oil applying means being vertically moveable in synchronism with said movement of said mold member and having an oil supply tube and means for attaching said oil applying means to said reciprocatable support, said tube being axially moveable, in said means for attaching, by contact between said oil supplying means and dough portions to cause oil to enter said supply tube and to coat said dough portions.

2. A machine as claimed in claim 1, wherein said means for penetrating into the surface of the dough portion comprise cutting edges provided on the mold member.

3. A machine as claimed in claim 1, wherein said molding tool is positioned behind said oil applying means, when seen in direction of travel of the dough portion.

4. A machine as claimed in claim 1, further comprising a spring acting on said oil supply tube so that said tube is forced by said spring towards the dough portion.

5. A machine as claimed in claim 1, wherein a plurality of supports for carrying dough portions is arranged in an endless chain moved stepwisely, said oil supply tube being arranged for one step of said chain in front of said mold member.

6. A machine as claimed in claim 1, wherein said oil supply tube comprises a piston guided for axial movement within a working chamber provided within said support for said oil supply tube, said piston opens said working chamber when said oil supply tube is moved upwardly relative to its support, but closes the working chamber under the action of said spring during the downward movement of said oil supply tube relative to its support, thereby supplying oil via a check valve to the dough portion.

7. A machine as claimed in claim 6, comprising a bushing surrounding said oil supply tube, and constituting a wall of said working chamber, said bushing being screwed into said support means for the oil supply tube and forming an abutment for said piston and also forming a guide means for the oil supply tube.

8. A machine as claimed in claim 6, further comprising an air venting valve connected to said working chamber at the top thereof.

9. A machine as claimed in claim 1, wherein the lower end of the oil supply tube comprises an enlargement.

10. A machine as claimed in claim 9, wherein said enlargement comprises a flange-like element provided on said tube.

11. A machine as claimed in claim 10, wherein said flange-like element simultaneously forms an abutment for a spring surrounding said oil supply tube and loading same towards the dough portion.

12. A machine as claimed in claim 10, wherein the oil supply tube protrudes over the lower surface of said enlargement.

* * * * *